United States Patent
Sakamaki

[11] Patent Number: 6,022,029
[45] Date of Patent: Feb. 8, 2000

[54] CHUCK ASSEMBLY

[75] Inventor: Akira Sakamaki, Ojiya, Japan

[73] Assignee: Yukiwa Seiko Kabushiki Kaisha, Nigata-Ken, Japan

[21] Appl. No.: 09/100,344

[22] Filed: Jun. 19, 1998

[51] Int. Cl.[7] .................................................. B23B 31/12
[52] U.S. Cl. .............................. 279/60; 279/62; 279/123; 279/902
[58] Field of Search ............................ 279/60–71, 73, 279/74, 123, 902; 269/265, 268, 902

[56] References Cited

U.S. PATENT DOCUMENTS

| | | | |
|---|---|---|---|
| 1,750,023 | 3/1930 | Prigan | 279/63 |
| 1,918,439 | 7/1933 | Warman | 279/123 |
| 4,630,836 | 12/1986 | Hunger et al. | 279/123 |
| 5,464,231 | 11/1995 | Clay | 279/123 |
| 5,816,584 | 10/1998 | Miles et al. | 279/60 |

FOREIGN PATENT DOCUMENTS 0 530 431  3/1996  European Pat. Off. .

5-208305  8/1993  Japan .

*Primary Examiner*—Steven C. Bishop
*Attorney, Agent, or Firm*—Sughrue, Mion, Zinn, Macpeak & Seas, PLLC

[57] ABSTRACT

An object of the present invention is to provide a chuck assembly which may make better the axis vibration precision of the tool and the grip rigidity of the tool. The chuck assembly wherein a plurality of jaws (2) each of which has an axis $L_2$ slanted relative to an axis $L_1$ of a chuck body (1) are provided on the chuck body (1), a male screw portion (2a) provided on each jaw (2) is engaged with a female screw portion (4a) of a rotatable nut member (4) provided on the chuck body (1), and the nut member (4) is rotated to open/close and advance/retract the jaws (2) to grip a shank (5a) of a tool (5) is characterized in that a cross-sectional shape of the tool grip portion of each jaw (2) is defined so as to grip the shank (5a) of the tool (5) by either one of the two corner portions B and H located in a right and left symmetrical condition relative to an axis $L_3$ of the tool (5) and/or two non-corner portions C and G located in a right and left symmetrical condition relative to the axis $L_3$ of the tool (5).

6 Claims, 12 Drawing Sheets

FIG. 2A
RELATED ART
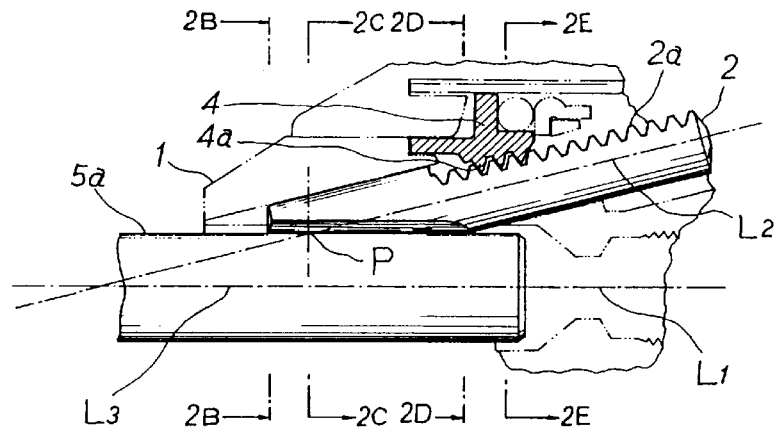
FIG. 2B
RELATED ART
FIG. 2D
RELATED ART
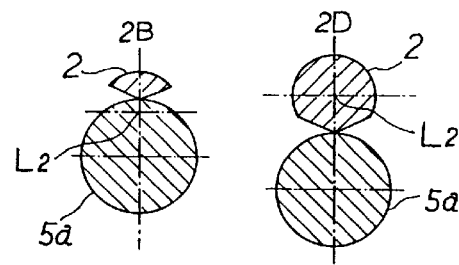
FIG. 2C
RELATED ART
FIG. 2E
RELATED ART
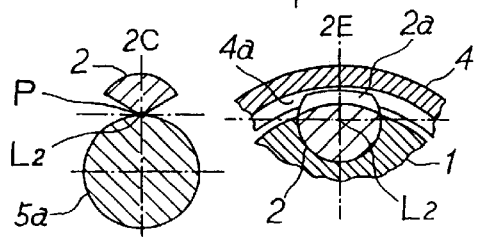
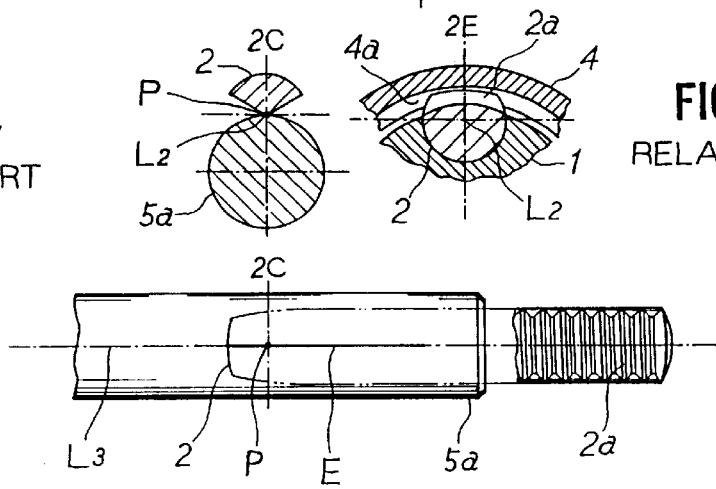
FIG. 2F
RELATED ART

FIG. 3A
RELATED ART
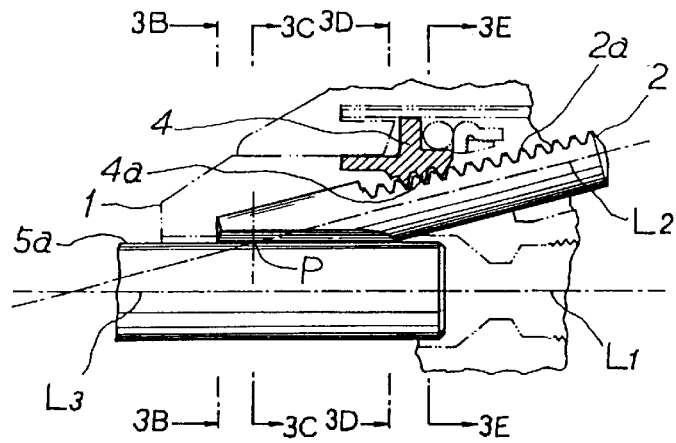
FIG. 3B
RELATED ART
FIG. 3C
RELATED ART
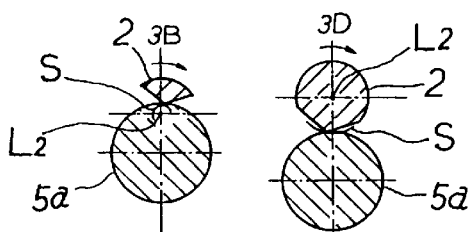
FIG. 3D
RELATED ART
FIG. 3E
RELATED ART
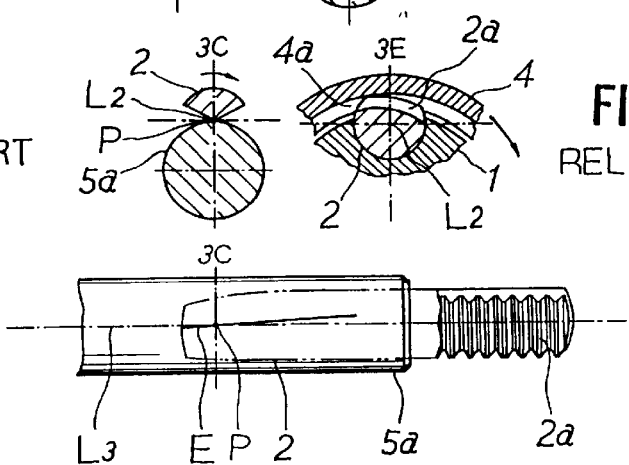
FIG. 3F
RELATED ART

FIG. 4A
RELATED ART
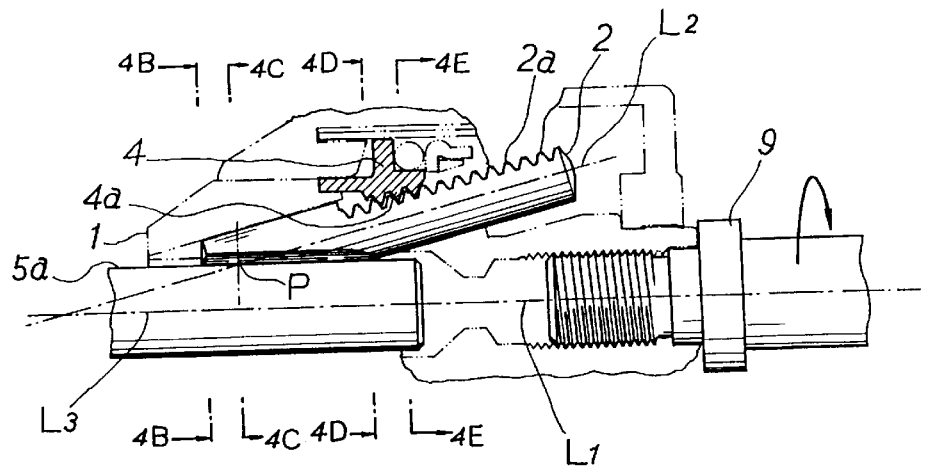
FIG. 4B
RELATED ART
FIG. 4D
RELATED ART
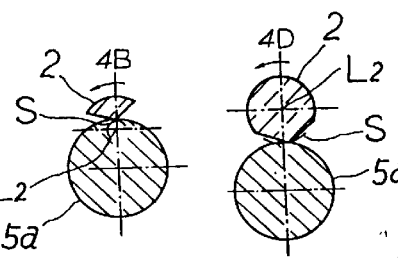
FIG. 4C
RELATED ART
FIG. 4E
RELATED ART
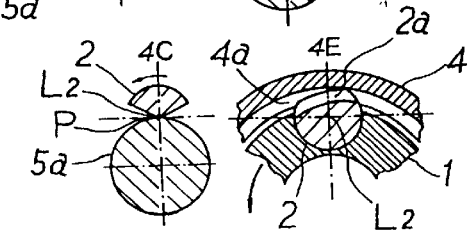
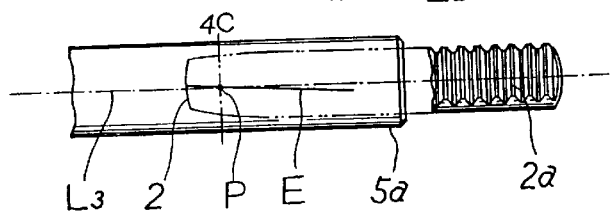
FIG. 4F
RELATED ART

CHUCK ASSEMBLY

BACKGROUND OF THE INVENTION

The present invention relates to a chuck assembly which is mainly mounted on a spindle shaft of an electric drill, a driver drill or a vibration drill, and more particularly to a chuck assembly used in a screw fastening operation or a boring operation with a tool such as a drill or bit.

A chuck assembly as shown in FIGS. 1A and 1B are conventionally known in which three jaws 2 each of which has an axis $L_2$ slanted relative to an axis $L_1$ of a chuck body 1 are provided on the chuck body 1, a male screw portion 2a provided on each jaw 2 is engaged with a female screw portion 4a of a nut member 4 rotated by the rotation of a rotary member 3 provided on the chuck body 1, and the nut member 4 is rotated by the rotation of he rotary member 3 to open/close and advance/retract the jaws 2 to grip a shank 5a of a tool 5. Reference numeral 9 denotes a spindle of an electric drill.

An object of such a chuck assembly is to perform the work by rotating the nut member 4 to push a tool grip portion of each jaw 2 against the outer circumferential surface of the shank 5a of the tool 5 to grip a tool 5 and rotating it. Accordingly, it is necessary to keep an axis vibration precision and a grip rigidity over the full range of the grip diameter.

By the way, in the case where the tool grip portion of each jaw 2 is kept under the condition that it is at one edge E or adjacent to an edge as shown in FIGS. 1A and 1B, the nut member 4 is rotated so that the tool grip portion of the jaw 2 is lightly contacted with the outer circumferential surface of the shank 5a of the tool 5 under a neutral condition with respect to the backlash as shown in FIGS. 2A to 2F. Thereafter, the nut member 4 is strongly rotated in a fastening direction and the tool grip portion of the jaw 2 is depressed against the shank 5a. As a result, the tool grip portion of the jaw 2 is rotated by the rotation of the nut member 4 so that the tool grip portion firmly holds the shank 5a as shown in FIGS. 3A to 3F. (In FIG. 3E, the arrow indicates the rotational direction of the nut member 4 when the shank 5a is fastened, and the reference character S indicates the locus of the tool grip portion.) When the electric drill or the like is rotated under this condition, a rotational torque is transmitted from an axial hole of the jaw 2 through the chuck body 1 to the jaw 2 so that the tool grip portion of the jaw 2 is rotated as shown in FIGS. 4A to 4F (In FIG. 4E, the arrow indicates the direction in which the rotational torque is applied) and the rotational torque is transmitted from the tool grip portion of the jaw 2 to the tool 5.

Thus, the force for rotating the jaws 2 is applied in the opposite directions between the case where the rotational torque is applied from the chuck body 1 upon machining and the case where the nut member 4 is rotated to grip the tool 5 by the tool grip portions of the jaws 2 (before machining).

Namely, in the case where the shape of the tool grip portion of each jaw 2 is at the edge E or adjacent to the edge as shown in FIGS. 1A to 1F, due to the phenomenon that the above-described jaw 2 is rotated about the axis $L_2$, the force is applied to the tool grip portion of the jaw 2 so that the grip portion on the front side from a point P in FIGS. 2F, 3F and 4F bites into the outer circumferential surface of the shank and the grip portion on the rear side from the point P is shifted in a direction away from the outer circumferential surface of the shank. In the case where the shank 5a of the tool 5 is thus gripped along the single line E, it is difficult to prevent the rotational phenomenon about the axis $L_2$ of the jaw 2 so that the axis vibration precision becomes worse.

In general, the jaws 2 and the shank 5a are made of steel material. The steel is not rigid but elastic material. Furthermore, the hardness of the tool grip portion of each jaw 2 is generally set at a higher level than the hardness of the shank 5a of the tool 5. Accordingly, when the nut member 4 is rotated so that the grip force by the jaws 2 is increased, the tool grip portions of the jaws 2 are brought into contact with the shank 5a of the tool 5 due to the bite phenomenon of the tool grip portions or the distortion of the grip portions. The line E of the tool grip portion of each jaw 2 relative to the axis $L_3$ of the tool 5 is slanted by the rotational phenomenon in contact with the outer circumferential surface of the shank 5a. In case of the large shank diameter, the curvature of the shank diameter is large. Accordingly, the grip condition of the grip portion on the rear side from the point P is not so bad. However, in case of the smaller shank diameter, in spite of the fact that the curvature of the shank diameter is small, the amount of the rotational phenomenon of the tool grip portion of each jaw 2 is the same as that in case of the larger diameter shank diameter (if the same person fastens the nut member 4 with the like force). The contact of the grip portion with the smaller shank outer circumferential surface becomes small. Accordingly, in comparison with the larger diameter shank, the stability of the grip portion of the smaller diameter shank becomes much worse. Also, the axis vibration precision would not be stabilized.

As described above, in the case where the shank surface of the tool is gripped by the single line E, there is a small effect to prevent the rotational phenomenon about the axis $L_2$ of the jaw 2, resulting in the poor stability in the axis vibration precision.

Accordingly, there has been another approach for maintaining the axis vibration precision at a satisfactory level, in which three jaws 2 are kept under the open condition, and the tool grip portions of the three jaws 2 are machined with a grinding/cutting tool while rotating the jaws 2. However, this process is very troublesome.

Furthermore, in the case where the tool grip portions of the jaws 2 are machined in the above-described process, in the case where the shank diameter for gripping is greater than the inner diameter obtained by machining (see FIG. 5), the grip is effected by two edges at points B and H. The shank is gripped by the two edge lines over the full length of the grip portion. Even if the nut member 4 is rotated to close and advance the jaws 2 or even if the rotational torque is transmitted from the chuck body 1, the outer circumferential surface of the shank is gripped by the two edge lines. As a result, the phenomenon in which the jaws are rotated about the axis $L_2$ is prevented by the respective edge lines. Also, the axis vibration precision would be stabilized. Also, although the edges are at obtuse angles, the grip rigidity may be kept to some extent by the slight bite phenomenon of the edge lines to the shank. (In general, the hardness of the tool grip portion of jaws 2 is set at a somewhat higher level than that of the shank 5a of the tool 5.)

However, in the case where the shank diameter for gripping is smaller than the inner diameter obtained by machining (see FIG. 6), the grip is effected by the point E on the arcuate line of the tool grip portion of the jaw 2, and the grip portion is in contact with the shank of the tool 5 at the single line E over the full length of he grip portion. As a result, it is difficult to prevent the rotational phenomenon of the jaw 2 about the axis $L_2$ as described above. The posture of the jaw 2 is not stabilized. Also, the axis vibration precision would become unstable. (In general, in case of the smaller diameter tool, it is unnecessary to keep a high grip rigidity but a high speed rotation is needed so that the vibration precision is particularly needed.)

Also, there is another means for enhancing the precision of each part of the chuck assembly as much as possible as a maintenance means for the axis vibration precision. The current situation thereof is such that the quality control of each part is very difficult.

By the way, as disclosed in EP 0530 431 B1 and as shown in FIGS. 7 and 8, there is another approach in which a shape of the tool grip portion of the jaw 2 takes a pair of asymmetrical edges relative to the axis $L_2$ of the jaw 2 to expect the bite of the shank 5a of the tool 5.

However, in this case, either one of the two edges is advanced to come into contact with the shank outer circumferential surface depending upon the shank diameter as shown in FIGS. 7 and 8 due to the magnitude of the shank diameter of the tool 5. The phenomenon in which the jaw 2 is rotated about the axis is generated upon fastening the tool 5 by rotating the nut member 4, and the rotational phenomenon is generated in the opposite direction during the machining work. Accordingly, even if the maintenance of the grip rigidity is possible according to this technology, it is impossible to obtain a satisfactory axis vibration precision.

SUMMARY OF THE INVENTION

An object of the present invention is to provide a chuck assembly which may make better the axis vibration precision of the tool and the grip rigidity of the tool by adopting a predetermined shape for the tool grip portions of the jaws 2.

According to a first aspect of the invention, there is provided a chuck assembly wherein a plurality of jaws 2 each of which has an axis $L_2$ slanted relative to an axis $L_1$ of a chuck body 1 are provided on the chuck body 1, a male screw portion 2a provided on each jaw 2 is engaged with a female screw portion 4a of a rotatable nut member 4 provided on the chuck body 1, and the nut member 4 is rotated to open/close and advance/retract the jaws 2 to grip a shank 5a of a tool 5, characterized in that a cross-sectional shape of the tool grip portion of each jaw 2 is defined so as to grip the shank 5a of the tool 5 by either one of the two corner portions B and H located in a right and left symmetrical condition relative to an axis $L_3$ of the tool 5 and/or two non-corner portions C and G located in a right and left symmetrical condition relative to the axis $L_3$ of the tool 5.

Also, in the chuck assembly, the case where the shank is gripped by the two corner portions B and H is the case of a large diameter shank 5a, and wherein the case where the shank is gripped by the two non-corner portions C and G is the case of a small diameter shank 5a.

Also, in the chuck assembly, the non-corner portions C and G are surfaces which are in contact with an outer circumferential surface of the small diameter shank 5a.

According to a second aspect of the invention, there is provided a chuck assembly wherein a plurality of jaws 2 each of which has an axis $L_2$ slanted relative to an axis $L_1$, of a chuck body 1 are provided on the chuck body 1, a male screw portion 2a provided on each jaw 2 is engaged with a female screw portion 4a of a rotatable nut member 4 provided on the chuck body 1, and the nut member 4 is rotated to open/close and advance/retract the jaws 2 to grip a shank 5a of a tool 5, characterized in that a crossectional shape of the tool grip portion of each jaw 2 has a line A, a point B, a line C, a point D, a line E, a point F, a line G, a point H and a line I, the lines A and I, the points B and H, the lines C and G and the points D and F are set to be symmetrical with respect to the axis $L_2$ of the jaw 2, the line E is bisected by the axis $L_2$ of the jaw 2 and the points B and H are set to be located on the side of the axis $L_1$ of the chuck body 1 in comparison with the points D and F.

Also, in the chuck assembly, the points D and F are the same point and the same point is located on the axis $L_2$ of the jaw 2.

Also, in the chuck assembly, the lines C and G are straight lines and the line E is arcuate.

In the grip of the shank 5a of the large diameter tool 5, as shown in FIG. 9, the two edge lines having the bite effect grip the shank, and also, in the grip of the shank 5a of the small diameter tool 5, as shown in FIG. 10, the shank is gripped by the two surfaces to thereby ensure the grip rigidity as desired.

Incidentally, in case of the large diameter tool, in comparison with the small diameter tool, the RPM may be kept low but the grip rigidity must be high. In case of the small diameter tool, in comparison with the large diameter tool, the grip rigidity may be kept low but the high RPM is necessary. The axis vibration precision becomes more important than in the case of the large diameter tool.

Also, when the nut member 4 is rotated for gripping the shank 5a of the tool 5 with the tool grip portion of each jaw 2 before the working operation, the direction of the rotation of the phenomenon where the jaw 2 is rotated relative to the axis $L_2$ is, as mentioned before, opposite to the case where the working operation is started and the rotational torque is actually applied.

In this connection, according to the present invention, since the shank 5a is gripped by the two grip surfaces or the two edge lines, it is possible to prevent the rotational phenomenon in which the rotational directions are opposite to each other without fail, and it is possible to ensure the axis vibration precision in a stable manner over the entire range of the grip diameter.

As described above, in the actual work, since the axis vibration precision is not changed but stabilized before the machining work and during the machining work, it is possible to provide the chuck assembly which may obtain reliability from the users.

BRIEF DESCRIPTION OF THE DRAWINGS

In the accompanying drawings:

FIG. 2A is an illustration of a general chuck assembly showing a phenomenon where the jaws are rotated (the jaws are in contact with the tool: neutral position with respect to the backlash);

FIG. 2B is an illustration of a general chuck assembly showing a phenomenon where the jaws are rotated (the jaws are in contact with the tool: neutral position with respect to the backlash) taken along the line 2B of FIG. 2A;

FIG. 2C is an illustration of a general chuck assembly showing a phenomenon where the jaws are rotated (the jaws are in contact with the tool: neutral position with respect to the backlash) taken along the line 2C of FIG. 2A;

FIG. 2D is an illustration of a general chuck assembly showing a phenomenon where the jaws are rotated (the jaws are in contact with the tool: neutral position with respect to the backlash) taken along the line 2D of FIG. 2A;

FIG. 2E is an illustration of a general chuck assembly showing a phenomenon where the jaws are rotated (the jaws are in contact with the tool: neutral position with respect to the backlash) taken along the line 2E of FIG. 2A;

FIG. 2F is an illustration of a general chuck assembly showing a phenomenon where the jaws are rotated (the jaws are in contact with the tool: neutral position with respect to the backlash) taken along the line 2F of FIG. 2A;

FIG. 3A is an illustration of a general chuck assembly showing the phenomenon where the jaws are rotated (the jaws are further advanced and closed by rotating the nut member from the condition shown in FIG. 2A);

FIG. 3B is an illustration of a general chuck assembly showing the phenomenon where the jaws are rotated (the jaws are further advanced and closed by rotating the nut member from the condition shown in FIG. 2B) taken along the line 3B of FIG. 3A;

FIG. 3C is an illustration of a general chuck assembly showing the phenomenon where the jaws are rotated (the jaws are further advanced and closed by rotating the nut member from the condition shown in FIG. 2C) taken along the line 3C of FIG. 3A;

FIG. 3D is an illustration of a general chuck assembly showing the phenomenon where the jaws are rotated (the jaws are further advanced and closed by rotating the nut member from the condition shown in FIG. 2D) taken along the line 3D of FIG. 3A;

FIG. 3E is an illustration of a general chuck assembly showing the phenomenon where the jaws are rotated (the jaws are further advanced and closed by rotating the nut member from the condition shown in FIG. 2E) taken along the line 3E of FIG. 3A;

FIG. 3F is an illustration of a general chuck assembly showing the phenomenon where the jaws are rotated (the jaws are further advanced and closed by rotating the nut member from the condition shown in FIG. 2F) taken along the line 3F of FIG. 3A;

FIG. 4A is an illustration of a general chuck assembly showing the phenomenon where the jaws are rotated (the rotational torque is added in the condition shown in FIG. 3A);

FIG. 4B is an illustration of a general chuck assembly showing the phenomenon where the jaws are rotated (the rotational torque is added in the condition shown in FIG. 3B) taken along the line 4B of FIG. 4A;

FIG. 4C is an illustration of a general chuck assembly showing the phenomenon where the jaws are rotated (the rotational torque is added in the condition shown in FIG. 3C) taken along the line 4C of FIG. 4A;

FIG. 4D is an illustration of a general chuck assembly showing the phenomenon where the jaws are rotated (the rotational torque is added in the condition shown in FIG. 3D) taken along the line 4D of FIG. 4A;

FIG. 4E is an illustration of a general chuck assembly showing the phenomenon where the jaws are rotated (the rotational torque is added in the condition shown in FIG. 3E) taken along the line 4E of FIG. 4A;

FIG. 4F is an illustration of a general chuck assembly showing the phenomenon where the jaws are rotated (the rotational torque is added in the condition shown in FIG. 3F) taken along the line 4F of FIG. 4A;

DESCRIPTION OF THE PREFERRED EMBODIMENTS

The present invention will now be described with reference to the accompanying drawings.

Figure 1A:
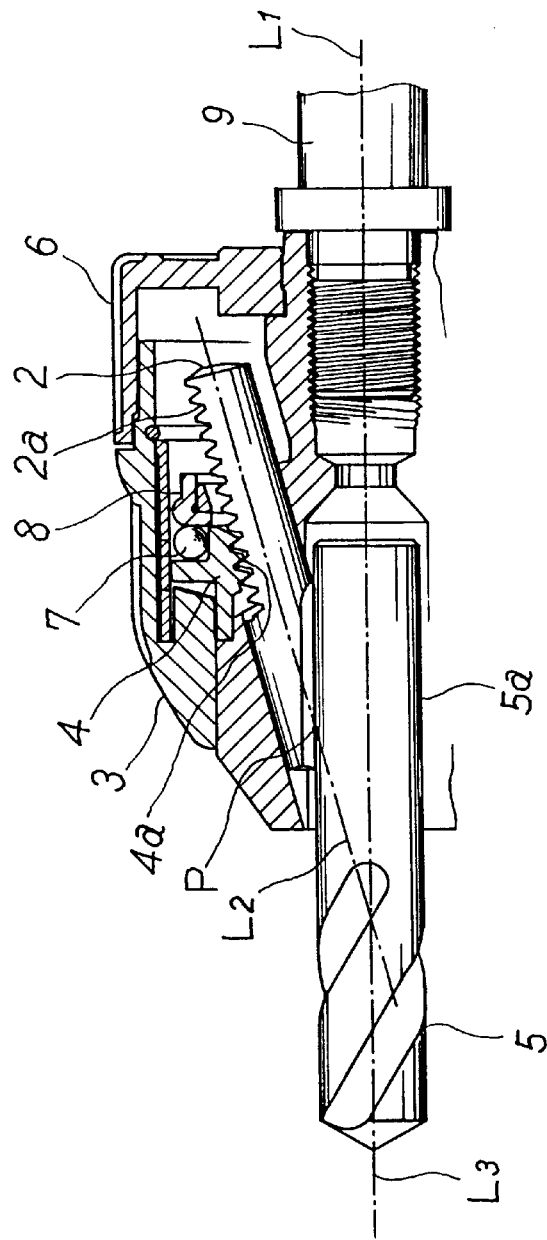
FIGS. 1A and 1B are illustrations of a general chuck assembly.
Figure 1B:
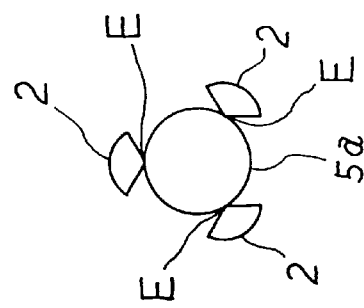
Figure 5:
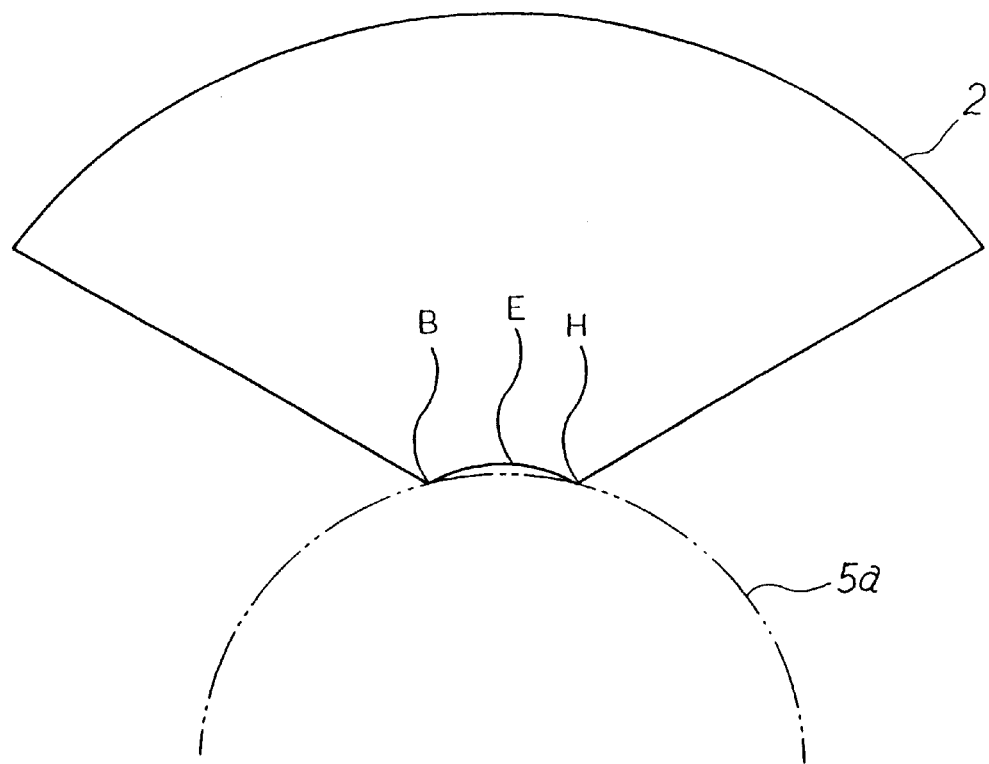
FIG. 5 is an illustration of the prior art.
Figure 6:
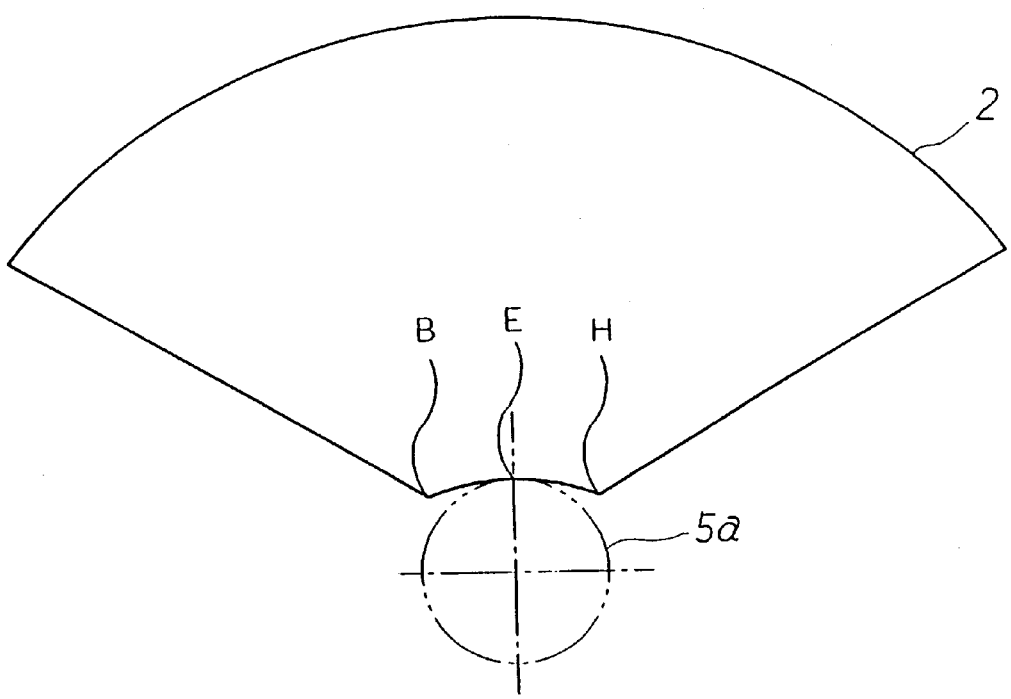
FIG. 6 is another illustration of the prior art.
Figure 7:
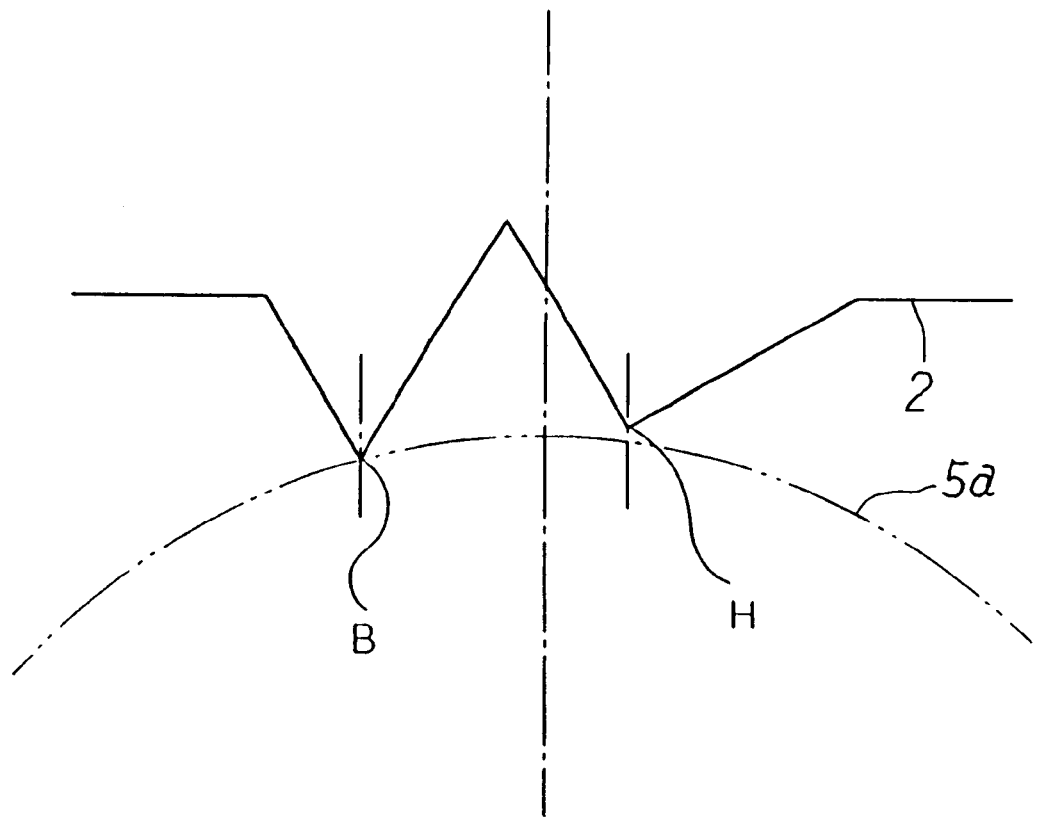
FIG. 7 is still another illustration of the prior art.
Figure 8:
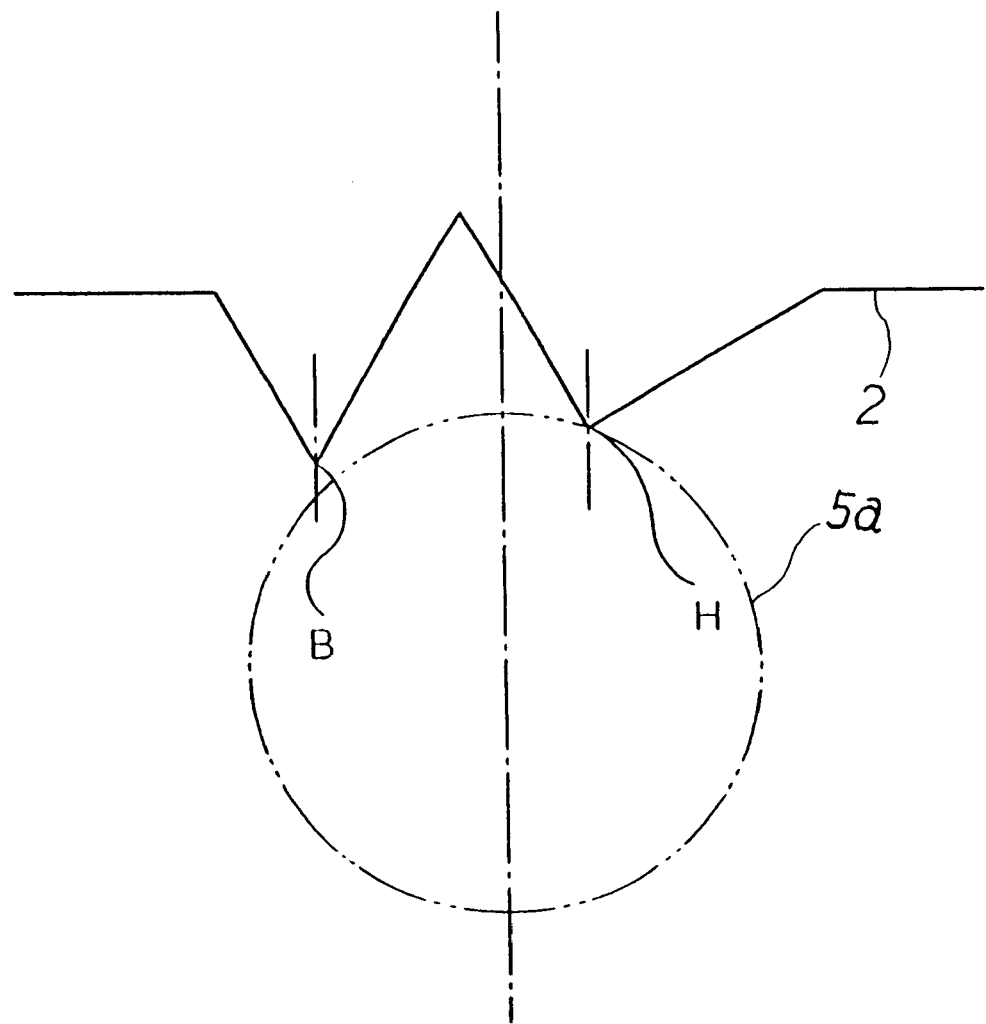
FIG. 8 is still another illustration of the prior art.
Figure 9:
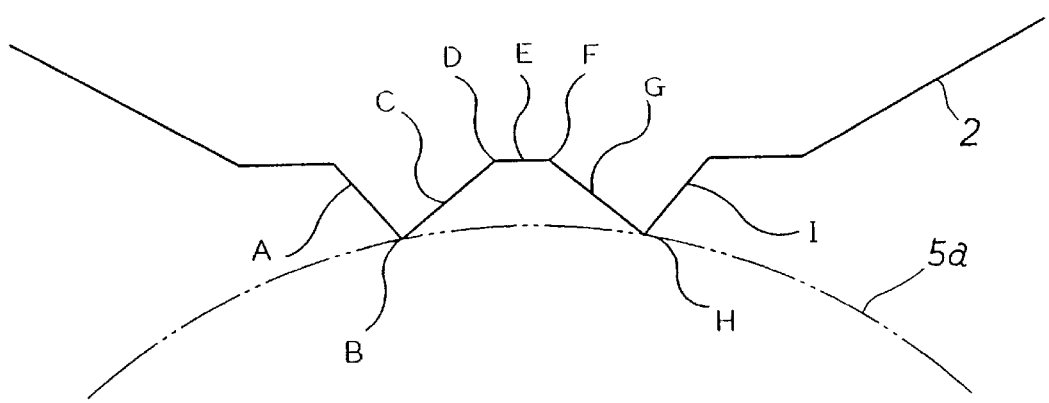
FIG. 9 is an illustration of an embodiment of the invention.
Figure 10:
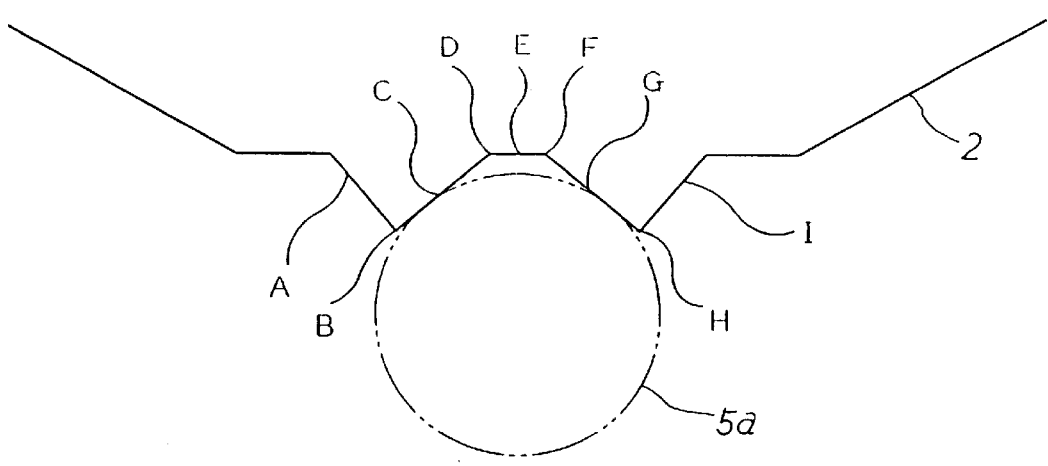
FIG. 10 is an illustration of the embodiment of the invention.

FIGS. 9 and 10 show a chuck assembly according to an embodiment of the present invention. Three jaws 2 each of which has an axis $L_2$ slanted relative to an axis $L_1$, of a chuck body 1 are provided on the chuck body 1, a male screw portion 2a provided on each jaw 2 is engaged with a female screw portion 4a of a nut member 4 rotated by the rotation of a rotary member 3 provided on the chuck body 1, and the nut member 4 is rotated by the rotation of a rotary member 3 to open/close and advance/retract the jaws 2 to grip a shank 5a of a tool 5. A cross-sectional shape of the tool grip portion of the jaw 2 has a line A (straight line), a point B, a line C (straight line), a point D, a line E (straight line), a point F, a line G (straight line), a point H and a line I (straight line). The lines A and I, the points B and H, the lines C and G and the points D and F are set to be symmetrical with respect to the axis $L_2$ of the jaw 2. Furthermore, the line E is bisected by the axis $L_2$ of the jaw 2 and the points B and H are set to be located on the side of the axis $L_1$ of the chuck body 1 in comparison with the points D and F. FIG. 9 shows a state where the jaw 2 according to the embodiment is in contact with the large diameter shank, and FIG. 10 shows a state where the jaw 2 according to the embodiment is in contact with the small diameter shank.

Reference numeral 6 denotes a grip sleeve, numeral 7 denotes a steel ball, and numeral 8 denotes a steel ball receiver.

The grip sleeve 6 is gripped, and the chuck assembly is mounted on a spindle 9 of, for example, an electric drill. The tool 5 is inserted among the three jaws 2, and the rotary member 3 is rotated so that the nut member 4 is rotated. As a result, the jaws 2 are closed and advanced to thereby grip the shank 5a of the tool 5 by the three jaws 2.

In this case, since the jaws 2 according to the embodiment take the above-described shape, the grip of the tool 5 is ensured and the axis vibration precision becomes better.

Figure 11:
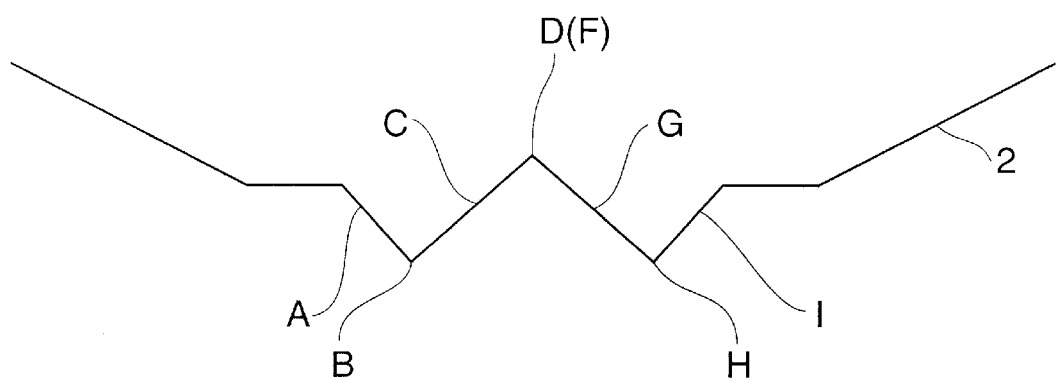
FIG. 11 is an illustration of another embodiment of the invention.
Figure 12:
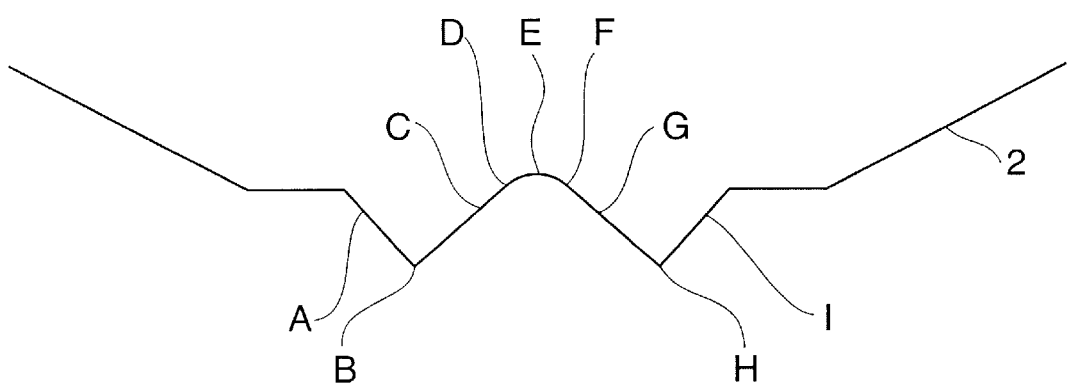
FIG. 12 is an illustration of a fur,her embodiment of the invention.

Incidentally, if the points D and F are the same as in FIG. 11, and the same point is located on the axis $L_2$ of the jaw 2, it is possible to obtain the same advantage. Also, the line E may be arcuate as in FIG. 12.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A chuck assembly wherein a plurality of jaws (2) each of which has an axis $L_2$ slanted relative to an axis $L_1$ of a chuck body (1) are provided on the chuck body (1), a male screw portion (2a) provided on each jaw (2) is engaged with a female screw portion (4a) of a rotatable nut member (4)

provided on the chuck body (1), and the nut member (4) is rotated to open/close and advance/retract the jaws (2) to grip a shank (5a) of a tool (5), characterized in that a cross-sectional shape of a tool grip portion of each jaw (2) is defined so as to grip the shank (5a) of the tool (5) by either two corner portions B and H located in a right and left symmetrical condition relative to an axis $L_3$ of the tool (5) or two non-corner portions C and G located in a right and left symmetrical condition relative to the axis $L_3$ of the tool (5).

2. The chuck assembly according to claim 1, wherein the shank is gripped by the two corner portions B and H when the shank is a large diameter shank (5a), and wherein the shank is gripped by the two non-corner portions C and G when the shank is a small diameter shank (5a).

3. The chuck assembly according to claim 2, wherein the non-corner portions C and G are surfaces which are in contact with an outer circumferential surface of the small diameter shank (5a).

4. A chuck assembly wherein a plurality of jaws (2) each of which has an axis $L_2$ slanted relative to an axis $L_1$ of a chuck body (1) are provided on the chuck body (1), a male screw portion (2a) provided on each jaw (2) is engaged with a female screw portion (4a) of a rotatable nut member (4) provided on the chuck body (1), and the nut member (4) is rotated to open/close and advance/retract the jaws (2) to grip a shank (5a) of a tool (5);

characterized in that a cross-sectional shape of a tool grip portion of each jaw (2) includes a line A, a point B, a line C, a point D, a line E, a point F, a line G, a point H and a line I, wherein the lines A and I, the points B and H, the lines C and G and the points D and F are set to be symmetrical with respect to an axis $L_2$ of the jaw (2); the line E is bisected by the axis $L_2$ of the jaw (2); and the points B and H are peaks of projections extending away from the axis $L_2$ of the jaw (2), wherein the lines C and G are inside surfaces of each projection, the points D and F are end portions of the lines C and G, and a distance between the points B and H are larger than that of a distance between the points D and F, whereby the shank (5a) of the tool (5) is gripped by either the points B and H or the lines C and G.

5. The chuck assembly according to claim 4, wherein the lines C and G are straight lines and the line E is arcuate.

6. A chuck assembly wherein a plurality of jaws (2) each of which has an axis $L_2$ slanted relative to an axis $L_1$ of a chuck body (1) are provided on the chuck body (1), a male screw portion (2a) provided on each jaw (2) is engaged with a female screw portion (4a) of a rotatable nut member (4) provided on the chuck body (1), and the nut member (4) is rotated to open/close and advance/retract the jaws (2) to grip a shank (5a) of a tool (5), characterized in that a cross-sectional shape of a tool grip portion of each jaw (2) has a line A, a point B, a line C, a point D, a point F, a line G, a point H and a line I, the lines A and I, the points B and H, the lines C and G and the points D and F are set to be symmetrical with respect to the axis $L_2$ of the jaw (2)

wherein the points D and F are the same point and the same point is located on the axis $L_2$ of the jaw 2.

* * * * *

UNITED STATES PATENT AND TRADEMARK OFFICE
CERTIFICATE OF CORRECTION

PATENT NO. : 6,022,029
DATED : February 8, 2000
INVENTOR(S) : Akira Sakamaki

It is certified that error appears in the above-indentified patent and that said Letters Patent is hereby corrected as shown below:

Column 6, line 8, delete "fur.her" and insert --further--.

Column 7, line 8, delete "comer" and insert --corner--;

line 11, delete "comer" and insert --corner--; and line 13, delete "comer" and insert --corner--.

Signed and Sealed this

Twentieth Day of March, 2001

Attest:

NICHOLAS P. GODICI

*Attesting Officer*    *Acting Director of the United States Patent and Trademark Office*